United States Patent
Ikeda et al.

(10) Patent No.: US 9,421,604 B2
(45) Date of Patent: Aug. 23, 2016

(54) FASTENER DRIVING DEVICE

(75) Inventors: Yusuke Ikeda, Tokyo (JP); Toshiyuki Funato, Tokyo (JP); Takahiro Inagaki, Tokyo (JP); Mikio Nakamura, Tokyo (JP); Yosuke Ikeda, Tokyo (JP); Kunihiro Kuroi, Tokyo (JP); Akihito Suzuki, Tokyo (JP); Yuji Kondo, Tokyo (JP); Tsugumaru Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 349 days.

(21) Appl. No.: 14/112,316

(22) PCT Filed: Apr. 25, 2012

(86) PCT No.: PCT/JP2012/061151
§ 371 (c)(1),
(2), (4) Date: Oct. 17, 2013

(87) PCT Pub. No.: WO2012/147824
PCT Pub. Date: Nov. 1, 2012

(65) Prior Publication Data
US 2014/0223712 A1 Aug. 14, 2014

(30) Foreign Application Priority Data
Apr. 28, 2011 (JP) ................ 2011-100770

(51) Int. Cl.
*B21J 15/02* (2006.01)
*B21J 15/28* (2006.01)
(Continued)

(52) U.S. Cl.
CPC ................ *B21J 15/28* (2013.01); *B21J 15/04* (2013.01); *B21J 15/142* (2013.01); *B21J 15/147* (2013.01);
(Continued)

(58) Field of Classification Search
CPC .......... B21J 15/02; B21J 15/04; B21J 15/10; B21J 15/28; B21J 15/285; B29C 65/60; B29C 66/929; B29C 66/9241; B29C 66/8322; B29C 66/9221; Y10T 29/5373; Y10T 29/5377
See application file for complete search history.

(56) References Cited

U.S. PATENT DOCUMENTS

| | | | |
|---|---|---|---|
| 4,470,293 A * | 9/1984 | Redmon | G01N 3/307 73/12.09 |
| 6,219,898 B1 * | 4/2001 | Kubanek | B21J 15/02 29/34 B |

(Continued)

FOREIGN PATENT DOCUMENTS

| | | |
|---|---|---|
| JP | 52-18272 | 2/1977 |
| JP | 56-77042 | 6/1981 |

(Continued)

OTHER PUBLICATIONS

International Search Report issued Jul. 31, 2012 in International (PCT) Application No. PCT/JP2012/061151.

(Continued)

*Primary Examiner* — Edward Tolan
(74) *Attorney, Agent, or Firm* — Wenderoth, Lind & Ponack, L.L.P.

(57) ABSTRACT

This fastener driving device is equipped with an impact force applying device that repeatedly applies impact forces to a fastener; and a load cell that detects a reaction force acting on the impact force applying device. The impact force applying device stops the applying of the impact force to the fastener on the basis of a detection result of the reactive force.

16 Claims, 13 Drawing Sheets

(51) Int. Cl.
    *B21J 15/14* (2006.01)
    *B21J 15/32* (2006.01)
    *B21J 15/04* (2006.01)
    *B29C 65/56* (2006.01)
    *B29C 65/00* (2006.01)
    *F16B 5/02* (2006.01)

(52) U.S. Cl.
    CPC ............... *B21J 15/285* (2013.01); *B21J 15/32* (2013.01); *B29C 65/562* (2013.01); *B29C 66/1122* (2013.01); *B29C 66/21* (2013.01); *B29C 66/41* (2013.01); *B29C 66/721* (2013.01); *B29C 66/8322* (2013.01); *B29C 66/861* (2013.01); *B29C 66/863* (2013.01); *B29C 66/9221* (2013.01); *B29C 66/9241* (2013.01); *B29C 66/92921* (2013.01); *F16B 5/02* (2013.01); *Y10T 29/5373* (2015.01)

(56) References Cited

U.S. PATENT DOCUMENTS

| | | | | |
|---|---|---|---|---|
| 6,276,050 | B1* | 8/2001 | Mauer | B21J 15/025 29/243.53 |
| 7,331,205 | B2* | 2/2008 | Chitty | B21J 15/043 227/2 |
| 7,776,171 | B2* | 8/2010 | Lehto | B29C 66/1122 156/351 |
| 7,966,705 | B2* | 6/2011 | Morris | B21J 15/025 29/243.521 |
| 8,316,524 | B1* | 11/2012 | LeMieux | B21J 15/10 29/524.1 |
| 2004/0148761 | A1 | 8/2004 | Naito et al. | |
| 2006/0230591 | A1* | 10/2006 | Chitty | B21J 15/28 29/243.523 |
| 2007/0033788 | A1* | 2/2007 | Chitty | B21J 15/043 29/243.521 |
| 2007/0271764 | A1* | 11/2007 | Stevenson | B21J 15/043 29/522.1 |
| 2008/0177512 | A1* | 7/2008 | Wenzel | B21J 15/025 703/1 |
| 2008/0209712 | A1* | 9/2008 | Bisiach | B21J 15/14 29/592 |

FOREIGN PATENT DOCUMENTS

| | | |
|---|---|---|
| JP | 57-33975 | 2/1982 |
| JP | 57-181738 | 11/1982 |
| JP | 5-242 | 1/1993 |
| JP | 05-309436 | 11/1993 |
| JP | 6-39236 | 2/1994 |
| JP | 6-86838 | 3/1994 |
| JP | 11-90575 | 4/1999 |
| JP | 2000-135541 | 5/2000 |
| JP | 2002-28745 | 1/2002 |
| JP | 2003-1360 | 1/2003 |
| JP | 2003-220441 | 8/2003 |
| JP | 2007-203307 | 8/2007 |

OTHER PUBLICATIONS

International Preliminary Report on Patentability and Written Opinion of the International Searching Authority issued Oct. 29, 2013 in International (PCT) Application No. PCT/JP2012/061151.

Japanese Office Action issued Jun. 2, 2015 in corresponding Japanese Patent Application No. 2011-100770 with partial translation.

Decision to Grant a Patent issued May 17, 2016 in corresponding Japanese Application No. 2011-100770, with partial English translation.

* cited by examiner

FASTENER DRIVING DEVICE

TECHNICAL FIELD

The present invention relates to a technique for tightening a target to be tightened by a fastener (a fastener component) such as a bolt or rivet.

BACKGROUND ART

Techniques for tightening a target to be tightened with a fastener (a fastener component) such as a bolt or rivet are used for assembling an airplane or the like. A rivet driving device for tightening the target to be tightened with the rivet is known.

An automatic rivet driving device disclosed in a patent literature 1 (JP 2000-135541A) includes a riveter body that has a mechanism for driving the rivet into a work. The riveter body has a C-shape, which sandwiches the work in upper and lower direction. An upper head portion is provided at a top tip of the riveter body. A die is placed at a bottom tip of the riveter body.

FIG. 1 shows the above mentioned upper head portion 351. The upper head portion 351 is capable of reciprocating in the arrow direction by an oil hydraulic cylinder 352. On a bottom surface of the upper head portion 351, namely, on a position facing to a top surface side of a work 304, an elevating drill spindle 353, an elevating rivet swaging tool 354, and an elevating shaving cutter 355 are arranged on a straight line parallel to the arrow direction. A drill 356 is attached to the drill spindle 353. After the work 304 is set, the drill spindle 353 is lifted down and a rivet hole 304a is formed in the work 304. Next, the oil hydraulic cylinder 352 moves the rivet swaging tool 354 to a position at which the drill spindle 352 has been located. Next, the rivet swaging tool 354 descends with holding a rivet R to insert a shaft portion of the rivet R into the rivet hole 304a. Moreover, the rivet R is pushed by the die placed at the bottom tip of the riveter body and the rivet swaging tool 354. Thus, driving of the rivet R is completed. Meanwhile, the shaving cutter 355 is used when a head of the rivet R is removed.

A patent literature 2 (JP 2002-28745A) and a patent literature 3 (JP Heisei-5-000242U) disclose other rivet driving devices.

In recent years, cases are increasing in which a composite material component such as fiber-reinforced plastic is used instead of a metallic component. For example, many composite material components have been used in an airplane.

With reference to FIGS. 2 to 7, a method of manually tightening the target to be tightened which is a composite material will be explained.

With reference to FIG. 2, a work 100 that is the target to be tightened includes a plurality of piled composite material components 51 and 52. A countersunk hole 100a is provided, penetrating from a surface 100b of one side of the work 100 to a surface 100c of the other side. A countersunk portion of the countersunk hole 100a is arranged on the surface 100b side. The work 100 has a countersunk hole wall surface 100d that surrounds the countersunk portion of the countersunk hole 100a. After the formation of the countersunk hole 100a, the work 100 is cleaned, and burrs formed during the formation of the countersunk hole 100a are removed.

FIG. 3 shows a fastener 25 which is the fastening component for tightening the work 100. The fastener 25 includes a countersunk bolt 20 and a sleeve 40. The countersunk bolt 20 includes a head portion 21, a cylinder portion 22 and a screw portion 23. The head portion 21 includes a head top surface 21a and a head side surface 21b. The head side surface 21b is a conic surface. The cylinder portion 22 is arranged between the head portion 21 and the screw portion 23. A screw is not formed in the cylinder portion 22. The screw portion 23 has an end surface 23a. The head top surface 21a and the end surface 23a are arranged at both ends in an axis direction of the fastener 25. The sleeve 40 covers the cylinder portion 22. The cylinder portion 22 is exposed from the sleeve 40 at a portion close to the head portion 21. The sleeve 40 includes a countersunk portion 41 arranged on the head portion 21 side, and a cylinder portion 42 arranged on the screw portion 23 side. The countersunk portion 41 is cone-shaped.

With reference to FIG. 4, the fastener 25 is pushed into the countersunk hole 100a so that the countersunk portion 41 contacts with the countersunk hole wall surface 100d. When the countersunk portion 41 contacts with the countersunk hole wall surface 100d, the head portion 21 is protruded from the surface 100b, and the screw portion 23 is protruded from the surface 100c.

With reference to FIG. 5, impact forces are repeatedly added to the head top surface 21a by an air hammer 200 to drive the fastener 25.

With reference to FIG. 6, until the fastener 25 is seated on the work 100, namely, until the head portion 21 contacts with the countersunk hole wall surface 100d through the countersunk portion 41, the impact forces are repeatedly applied to the head top surface 21a by the air hammer 200. Here, a worker determines, by a tone, that the fastener 25 is seated, and stops the addition of the impact forces by the air hammer 200.

With reference to FIG. 7, a nut 30 is attached to the screw portion 23, and the composite material components 51 and 52 are tightened.

Here, since the impact forces are repeatedly applied to drive the fastener 25, a risk of damages in the composite material components 51 and 52 is reduced, compared with a case where the fastener 25 is pushed until the head portion 21 contacts with the countersunk hole wall surface 100d through the countersunk portion 41. However, in a case where a process for repeatedly applying the impact forces to drive the fastener 25 is automated, some kind of means is necessary for automatically detecting the seating of the fastener 25.

Also, in a case where the automatic rivet driving device disclosed in Patent literature 1 (JP 2000-135541A) is used for driving the rivet into the composite material, following problems may be arisen. When the above mentioned work 304 is the composite material, after the formation of the rivet hole 304a, the work 304 is removed from the automatic rivet driving device and the burrs formed during the formation of the rivet hole 304a are removed. After that, the work 304 is set again in the automatic rivet driving device, and the rivet swaging tool 354 is lifted down for inserting the shaft portion of the rivet R into the rivet hole 304a. Here, since the work 304 is set again, a misalignment may be occurred between the rivet swaging tool 354 and the rivet hole 304a.

CITATION LIST

Patent Literature

Patent Literature 1: JP 2000-135541A
Patent Literature 2: JP 2002-28745A
Patent Literature 3: JP Heisei-5-242U

SUMMARY OF THE INVENTION

An object of the present invention is to provide a fastener driving device and a method of driving fastener, which are able to automatically stop driving the faster.

A fastener driving device according to a first viewpoint of the present invention includes an impact force applying device configured to repeatedly apply impact forces to a fastener, and a load cell configured to detect a reactive force acting on the impact force applying device. The impact force applying device stops applying the impact forces based on a detection result of the reactive force.

Preferably, the above mentioned fastener driving device includes a head base, a moving device configured to move the head base along a first straight line, a moving body supported by the head base so as to be movable along the first straight line, a spring configured to bias the moving body along the first straight line, and a chuck configured to hold the fastener. The chuck is supported by the moving body.

Preferably, the impact force applying device includes a snap driver attached to the head base, and a snap configured to be driven by the snap driver to reciprocate on the first straight line. The chuck is configured to hold the fastener so that the fastener is arranged on the first straight line.

Preferably, the chuck is attached to the moving body through an automatic alignment unit. The automatic alignment unit includes a plurality of elastic bodies arranged in parallel between the moving body and the chuck. The plurality of elastic bodies connect the moving body and the chuck, so that the chuck is movable in a plane perpendicular to the first straight line and the chuck is able to swing around a swinging axis which is perpendicular to the first straight line.

Preferably, the above mentioned fastener driving device further includes a shelf board on which the fastener stands so that a head portion of the faster is lower side, and a fastener feeding device configured to feed the fastener to the chuck from the shelf board. Notches are provided in the shelf board. The fastener feeding device includes a holding portion configured to hold the fastener in an axial direction of the fastener. The holding portion includes a first part and a second part respectively contacting with one and another ends of the fastener in the axial direction. The holding portion is configured to be rotatable so that the first part and the second part turn upside down.

Preferably, the shelf board is a circular shape. The notches are provided so as to extend toward a center from an edge of the shelf board. The shelf board is configured to rotate around a rotation axis passing through the center.

Preferably, the above mentioned fastener driving device further includes a first detector configured to detect a first displacement of the head base along the first straight line, and a second detector configured to detect a second displacement of the moving body relative to the head base along the first straight line. The chuck is configured to release the fastener on the basis of the first displacement and the second displacement.

A method of driving fastener according to a second viewpoint of the present invention includes repeatedly applying impact forces to a fastener by an impact force applying device, detecting a reactive force acting on the impact force applying device, and stopping the impact force applying device applying the impact force to the fastener, based on a detection result of the reactive force.

Preferably, the impact force applying device includes a snap, and a snap driver configured to drive the snap. The repeatedly applying impact forces includes moving, by a moving device, the snap driver toward a work in which the fastener is driven at a predetermined speed, and repeatedly hitting the fastener by the snap while the snap driver moves toward the work at the predetermined speed. The predetermined speed is smaller than a speed at which the fastener is hit by the snap to be driven.

Preferably, the above mentioned method of driving fastener further includes pushing the fastener into a hole provided in the work, by an inserting head, and releasing the fastener. The inserting head includes a head base, a moving body supported by the head base so as to be movable along a first straight line, a spring configured to bias the moving body along the first straight line, and a chuck configured to hold the fastener. The chuck is supported by the moving body. The pushing the fastener into a hole provided in the work includes moving the head base along the first straight line, and adjusting a force for pushing the fastener into the hole, by the spring. In the releasing the fastener, the chuck releases the fastener.

Preferably, the impact force applying device includes a snap driver attached to the head base, and a snap configured to be driven by the snap driver. In the pushing the fastener into the hole provided in the work, the chuck holds the fastener so that the fastener is arranged on the first straight line. In the repeatedly applying impact forces to a fastener, the snap driver drives the snap so as to reciprocate on the first straight line.

Preferably, the chuck is attached to the moving body through an automatic alignment unit. The automatic alignment unit includes a plurality of elastic bodies arranged in parallel between the moving body and the chuck. In the pushing the fastener into the hole provided in the work includes adjusting a misalignment of centers between the fastener and the hole, by the plurality of elastic bodies.

Preferably, the above mentioned method of driving fastener further includes holding the fastener in an axial direction of the fastener by a holding portion of a fastener feeding device, the fastener standing on a shelf board in which notches are provided with a head portion of the fastener being lower side, and rotating the holding portion so that the head portion is upper side, moving the fastener feeding device, holding an axial portion of the fastener by the chuck, and releasing the fastener by the holding portion.

Preferably, the shelf board is a circular shape. The notches are provided so as to extend from an edge of the shelf board to a center. The above mentioned method of driving fastener further includes rotating the shelf board around a rotation axis passing through the center.

Preferably, the above mentioned method of driving fastener further includes detecting a first displacement of the head base along the first straight line, detecting a second displacement of the moving body relative to the head base along the first straight line, and releasing, by the chuck, the fastener on the basis of the first displacement and the second displacement.

According to the present invention, a fastener driving device and a method of driving fastener are provided, which are able to automatically stop driving a fastener.

BRIEF DESCRIPTION OF THE DRAWINGS

The above-mentioned object, other objects, advantages and features of the present invention will be more apparent from description of the embodiments in conjunction with the accompanying drawings in which.

DESCRIPTION OF EMBODIMENTS

With reference to the attached drawings, embodiments of a fastener driving device and a method of driving a fastener according to the present invention will be explained below.

First Embodiment

Figure 1:
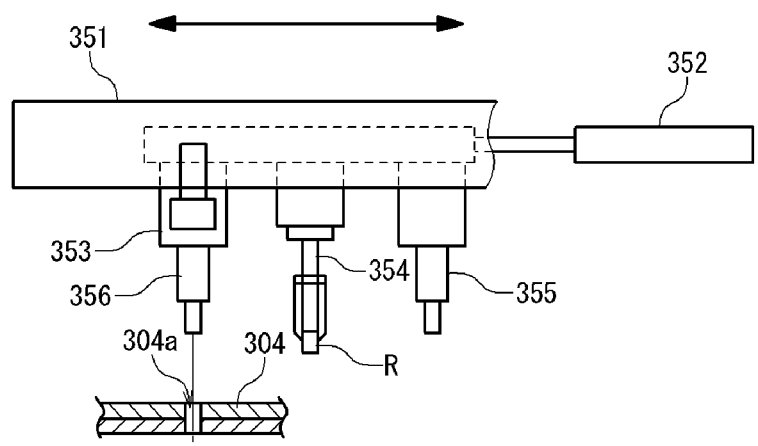
FIG. 1 indicates an upper head portion for forming a rivet hole in a work to drive a rivet.
Figure 2:
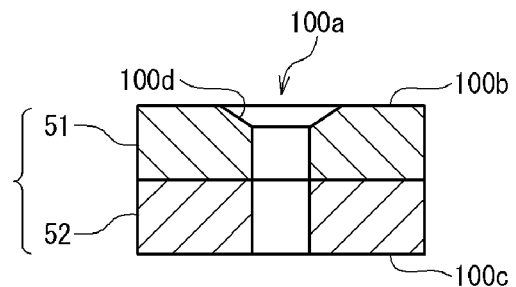
FIG. 2 is a cross-sectional view indicating the work in which a countersunk hole is formed.
Figure 3:
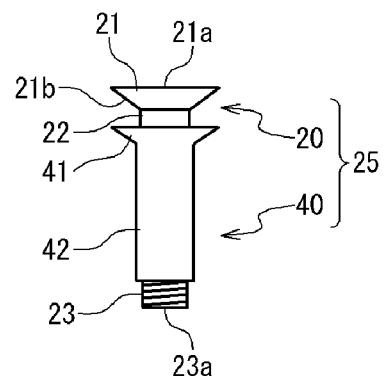
FIG. 3 indicates a fastener for tightening the work.
Figure 4:
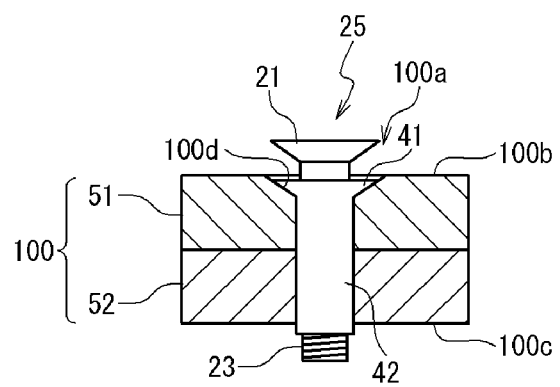
FIG. 4 is a cross-sectional view indicating the work when the fastener is pushed into the countersunk hole.
Figure 5:
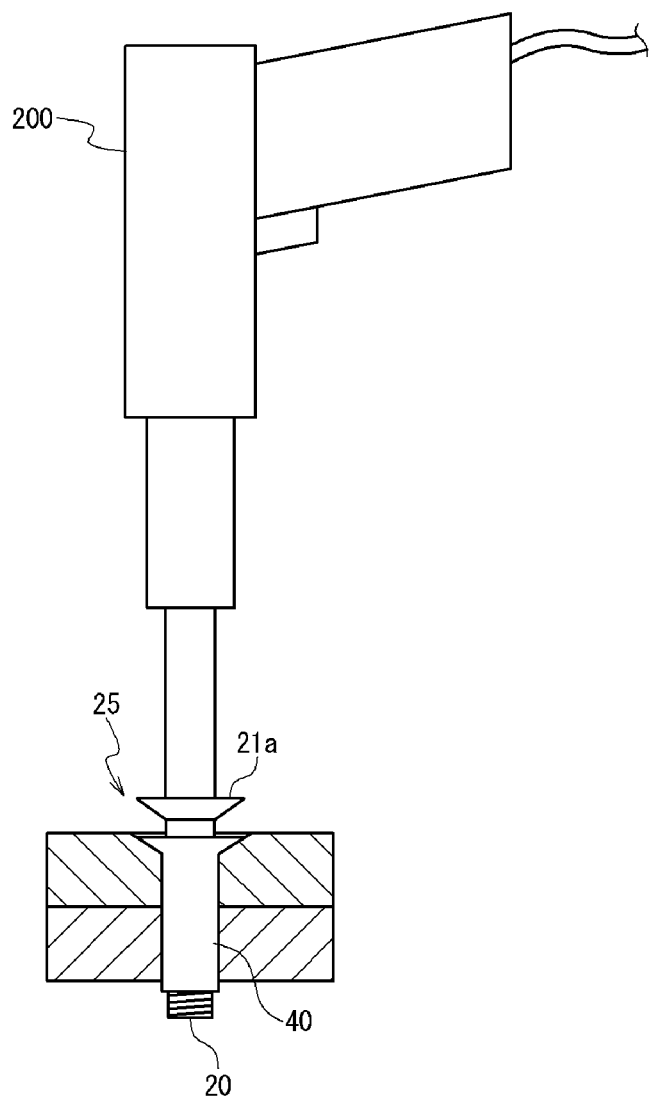
FIG. 5 is a cross-sectional view indicating the work when the fastener is driven by an air hammer.
Figure 6:
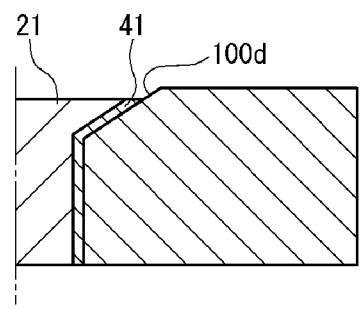
FIG. 6 is a cross-sectional view indicating the work when the driving of the fastener is completed.
Figure 7:
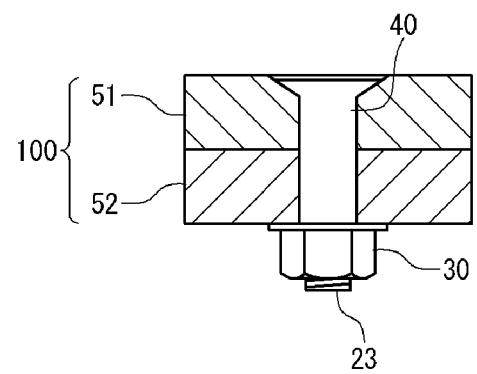
FIG. 7 is a cross-sectional view indicating the work in which a nut is attached to the fastener.
Figure 8:
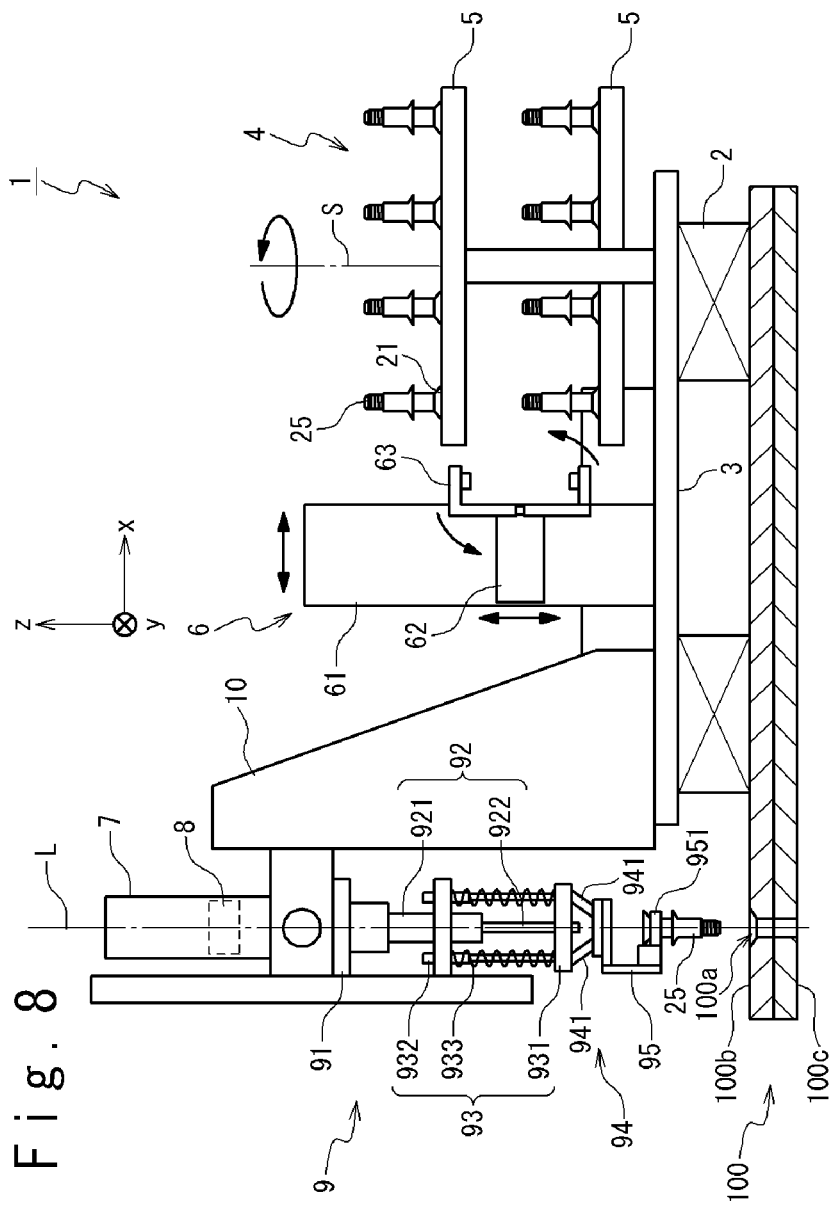
FIG. 8 is a schematic diagram indicating a fastener driving device according to a first embodiment of the present invention.

FIG. 8 shows a fastener driving device 1 according to the first embodiment of the present invention. An X axis, a Y axis and a Z axis are defined to be orthogonal to each other. The Z axis is vertical or approximately vertical. The fastener driving device 1 includes a vacuum rail 2, a base 3, a cartridge 4, a fastener feeding device 6, a moving device 7, a load cell 8, a rivet inserting-driving head 9 and a frame 10. The vacuum rail 2 is fixed to a work 100. The work 100 is configured as shown in FIG. 2. Surfaces 100b and 100c of the work 100 are horizontal or approximately horizontal, and an axial direction of a countersunk hole 100a provided in the work 100 is vertical or approximately vertical. The base 3 is movable in a plane vertical to the Z axis, along the vacuum rail 2. The cartridge 4 and the fastener feeding device 6 are placed on the base 3. The frame 10 is fixed to the base 3. The frame 10 supports the moving device 7. The moving device 7 moves the rivet inserting-driving head 9 along the Z axis. The cartridge 4 has a function of mounting a plurality of fasteners 25. The fasteners 25 are configured as mentioned above. The fastener feeding device 6 has a function for feeding the fastener 25 from the cartridge 4 to the rivet inserting-driving head 9. The rivet inserting-driving head 9 has a function for pushing and driving the fastener 25 into the countersunk hole 100a provided in the work 100.

The cartridge 4 includes a plurality of shelf boards 5. The plurality of shelf boards 5 are arranged at different heights. The fasteners 25 are stood on the shelf board 9 so that a head portion 21 becomes lower side. The plurality of shelf boards 5 are rotatable around a rotation axis S parallel to the Z axis, standing the fasteners 25.

The fastener feeding device 6 includes a main body 61, an elevating portion 62 and a holding portion 63. The main body 61 moves in a plane vertical to the Z axis, on the base 3. The elevating portion 62 is supported by the main body 61, and is lifted up and down along the Z axis, relative to the main body 61. The holding portion 63 is supported by the elevating portion 62 and rotates relative to the elevating portion 62. A rotation axis of the holding portion 63 is vertical to the Z axis.

The rivet inserting-driving head 9 includes a head base 91, an impact force applying device 92, an insertion force adjusting unit 93, an automatic alignment unit 94 and a chuck 95. The moving device 7 supports the head base 91 and moves the head base 91 along the Z axis. The impact force applying device 92 includes a snap driver 921 and a snap 922. The snap driver 921 is attached to the head base 91. The snap driver 921 drives the snap 922 so that the snap 922 is reciprocated on a straight line L. The straight line L is parallel to the Z axis. The impact force applying device 92 is, for example, an air hammer for driving the snap 922 by an air, or an electromagnetic hammer for electromagnetically driving the snap 922. The insertion force adjusting unit 93 includes a moving body 931, a guide 932 and a spring 933. The moving body 931 is supported by the head base 91 so as to be movable along the Z axis. The guide 932 guides the moving body 931 along the Z axis, relative to the head base 91. The spring 933 biases the moving body 931 along the Z axis. Specifically, the spring 933 biases the moving body 931 toward the work 100. The chuck 95 is attached through the automatic alignment unit 94 to the moving body 931. The automatic alignment unit 94 includes a plurality of elastic bodies 941 which are arranged to be parallel between the moving body 931 and the chuck 95. The plurality of elastic bodies 941 connect the moving body 931 and the chuck 95 so that the chuck 95 is movable in a plane vertical to the Z axis and is able to swing around a swinging axis which is vertical to the Z axis. For example, the plurality of elastic bodies 941 connect the moving body 931 and the chuck 95, so that the chuck 95 is movable along each of the Z axis and the Y axis and is able to swing around each of a swinging axis parallel to the X axis and a swinging axis parallel to the Y axis. The chuck 95 holds the fastener 25 so that the fastener 25 is arranged on the straight line L. The chuck 95 includes a holding portion 951 for sandwiching and holding the shaft portion (for example, the cylinder portion 22) of the fastener 25.

Figure 9:
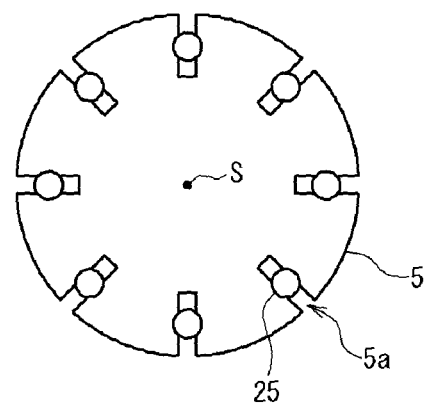
FIG. 9 is a plan view indicating a shelf board.

FIG. 9 is a plan view indicating the shelf board 5. The shelf board 5 is circular shape. The rotation axis S passes through a center of the shelf board 5. In the shelf board 5, a plurality of notches 5a are provided to extend from an outer edge of the shelf board 5 toward the center. The plurality of notches 5a are radially arranged around the center of the shelf board 5. The fastener 25 is arranged on the notch 5a. Meanwhile, when the shelf board 5 is not rotated, the shelf board 5 may not be circular.

Figure 10:
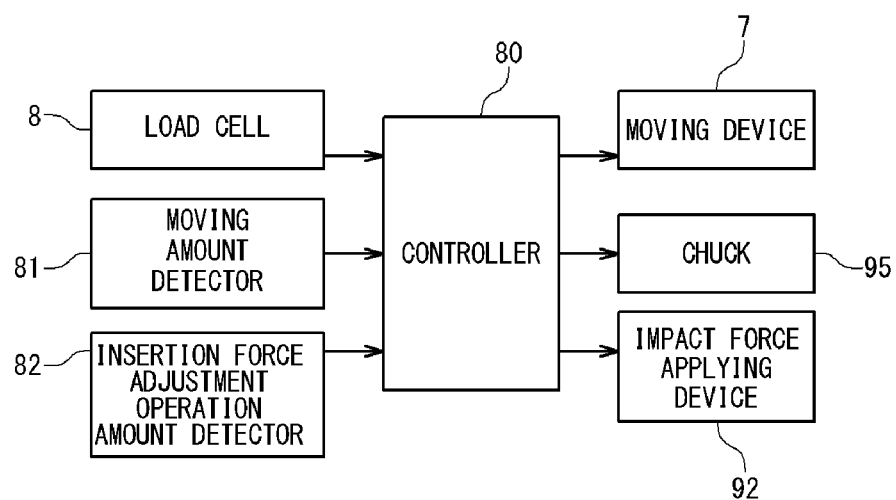
FIG. 10 is a block diagram indicating a control system.

With reference to FIG. 10, a control system of the fastener driving device 1 will be explained below. The control system of the fastener driving device 1 includes a controller 80, a moving amount detector 81 and an insertion force adjustment operation amount detector 82, in addition to the load cell 8, the moving device 7, the impact force applying device 92 and the chuck 95. The load cell 8 detects a reactive force acting on the snap driver 921 of the impact force applying device 92, and outputs the detected result to the controller 80. The moving amount detector 81 detects a moving amount of the moving device 7, namely, a displacement of the head base 91 along the Z axis, and outputs the detected result to the controller 80. The insertion force adjustment operation amount detector 82 detects an operation amount of the insertion force adjusting unit 93, namely, a displacement of the moving body 931 relative to the head base 91 along the z axis, and outputs the detected result to the controller 80. The controller 80 controls the moving device 70, the impact force applying device 92 and the chuck 95.

The method of driving fastener according to the present embodiment will be described below. The method of driving fastener includes: a step of setting the fastener 25 in the rivet inserting-driving head 9; a step of pushing the fastener 25 into the countersunk hole 100a provided in the work 100; and a step of driving the fastener 25.

At first, the step of setting the fastener 25 into the rivet inserting-driving head 9 will be described.

Figure 11:
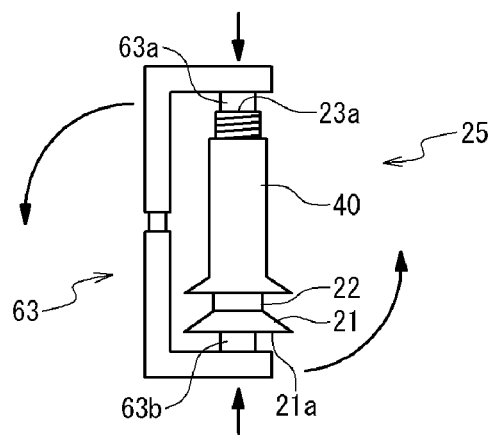
FIG. 11 indicates a state in which a holding portion of a fastener feeding device holds the fastener.

FIG. 11 indicates the holding portion 63 of the fastener feeding device 6, holding the fastener 25 standing on the shelf board 5. The holding portion 63 includes a holding portion first part 63a and a holding portion second part 63b. The holding portion 63 sandwiches the fastener 25 in an axial direction of the fastener 25, so that the holding portion first part 63a is in contact with the end surface 23a and the holding portion second part 63b is in contact with the head top surface 21a. At this time, since the fastener 25 is arranged on the notch 5a, the holding portion 63 is prevented from being interfered by the shelf board 5. Since the shelf board 5 is rotated, the holding portion 63 is able to hold the fasteners 25, which are arranged on the different notches 5a, at same position. After that, the fastener feeding device 6 feeds the fastener 25 from the shelf board 5 to the chuck 95. During the feeding of the fastener 25, the main body 61 moves toward the rivet inserting-driving head 9, and the elevating portion 62 is lifted up or down to a height that is suitable for delivering the fastener 25 to the chuck 95, and the holding portion 63 is rotated such that the holding portion first part 63a and the holding portion second part 63b turn upside down. As the result of the rotation of the holding portion 63, the head portion 21 of the fastener 25 becomes an upper side.

Figure 12:
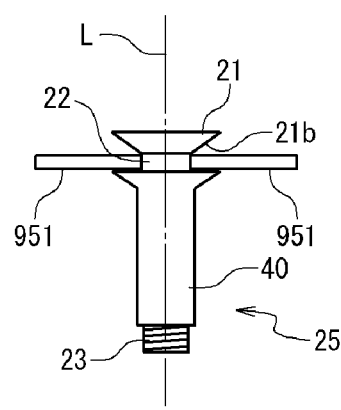
FIG. 12 indicates a state in which a holding portion of a chuck holds the fastener.

With reference to FIG. 12, the holding portion 951 of the chuck 95 holds the shaft portion of the fastener 25 that is held by the holding portion 63. Here, since the holding portion 63 holds the fastener 25 in the axial direction, the holding portion 951 is able to hold and sandwich any position of the shaft portion of the fastener 25. Thus, the holding portion 951 is able to hold the cylinder portion 22 at a portion close to the head portion 21 (a portion exposed from the sleeve 40). The holding portion 951 holds the fastener 25 so that the head portion 21 is an upper side, namely, the screw portion 23 faces to the work 100 and the fastener 21 are arranged along the straight line L. After the holding portion 951 holds the fastener 25, the holding portion 63 releases the fastener 25.

Meanwhile, when sealing agent is coated on the head side 21b and the sleeve 40, it is especially effective that the fastener 25 stands on the shelf board 5, the holding portion 63 of the fastener feeding device 6 holds the fastener 25 in the axial direction, and that the holding portion 951 of the rivet inserting-driving head 9 holds the cylinder portion 22 at a portion close to the head portion 21 (the portion exposed from the sleeve 40).

Subsequently, the step of pushing the fastener 25 into the countersunk hole 100a provided in the work 100 will be described. At this step, with a static load, the fastener 25 is inserted into the countersunk hole 100a.

Figure 13:
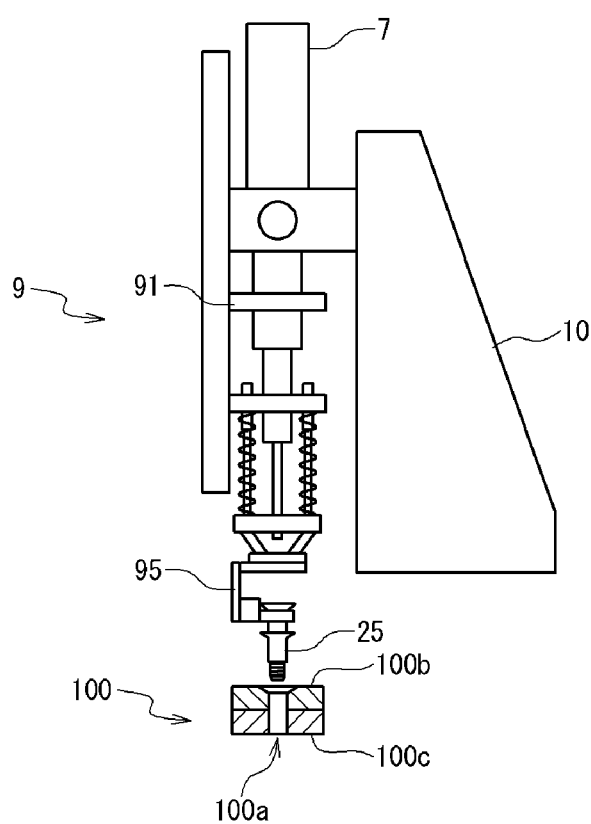
FIG. 13 indicates a vicinity of a rivet inserting-driving head of the fastener driving device at a step of pushing the fastener into a hole formed in the work.

With reference to FIG. 13, the moving device 7 moves the head base 91 along the Z axis. Consequently, the whole of the rivet inserting-driving head 9 approaches to the work 100.

Figure 14:
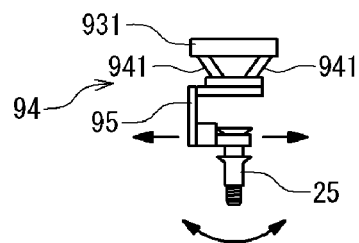
FIG. 14 is a conceptual diagram for explaining an operation of an automatic alignment unit.

With reference to FIG. 14, when there is a misalignment between the fastener 25 and the countersunk hole 100a, the plurality of elastic bodies 941 of the automatic alignment unit 94 adjust the misalignment. Thus, even if an adjustment of a position is slightly rough when the work 100 is set to the fastener driving device 1, the fastener 25 is inserted into the countersunk hole 100a with a correct pose.

Figure 15:
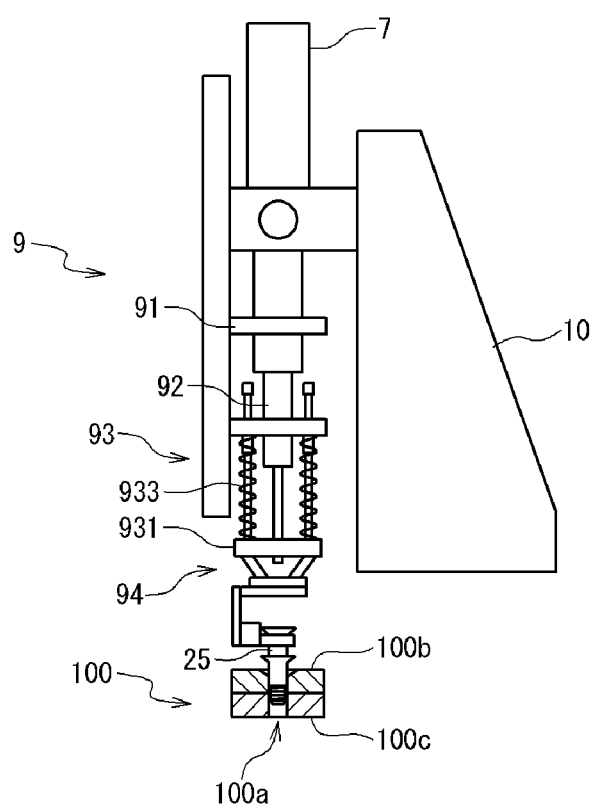
FIG. 15 indicates the vicinity of the rivet inserting-driving head of the fastener driving device when an insertion force adjusting unit is operated.

With reference to FIG. 15, the moving device 7 continues to move the head base 91 along the Z axis, and the fastener 25 is pushed into the countersunk hole 100a. At this time, the spring 933 adjusts a force for pushing the fastener 25 into the countersunk hole 100a. Thus, excessive force is prevented from acting on the fastener 25 and the work 100.

Since the moving device 7 continues to move the head base 91 along the Z axis, a time rate change of a displacement of the head base 91 detected by the moving amount detector 81 becomes equal to a time rate change of a displacement of the moving body 931 relative to the head base 91 detected by the insertion force adjustment operation amount detector 92, after the countersunk portion 41 of the fastener 25 contacts with the countersunk hole wall surface 100d of the work 100 to stop the fastener 25, the chuck 95, the automatic alignment unit 94 and the moving body 931. The controller 80 determines that the pushing of the fastener 25 is completed, on the basis of the displacement of the head base 91 and the displacement of the moving body 931 relative to the head base 91, and makes the chuck 95 release the fastener 25.

Subsequently, the step of driving the fastener 25 will be explained. At this step, impact loads are repeatedly applied to drive the fastener 25.

Figure 16:
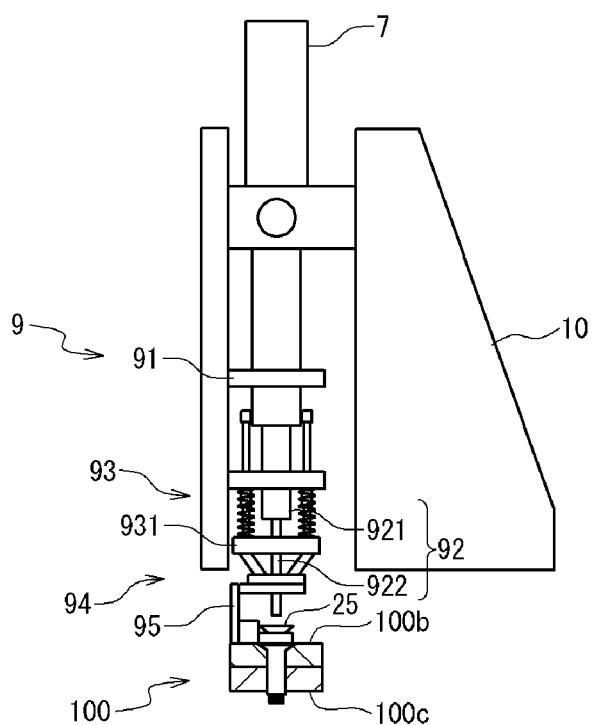
FIG. 16 indicates the vicinity of the rivet inserting-driving head of the fastener driving device at a step of driving fastener.

With reference to FIG. 16, after the chuck 95 releases the fastener 25, the controller 80 repeatedly applies impact forces to the fastener 25 by the impact force applying device 92, while moving the head base 91 along the Z axis by the moving device 7. The snap driver 921 of the impact force applying device 92 drives the snap 922 so that the snap 922 reciprocates along the straight line L, and repeatedly applies the impact forces to the fastener 25. Since the chuck 95 holds the fastener 25 so that the fastener 25 is arranged along the straight line L at the step of pushing the fastener 25 into the countersunk hole 100a, a transition from the step of pushing the fastener 25 to the step of driving the fastener 25 is smoothly performed.

Meanwhile, at the step of driving the fastener 25, since the chuck 95 is in contact with the surface 100b of the work 100, the moving body 931, the automatic alignment unit 94 and the chuck 95 are stopped, and only the head base 91 and the impact force applying device 92 move toward the work 100.

Figure 17:
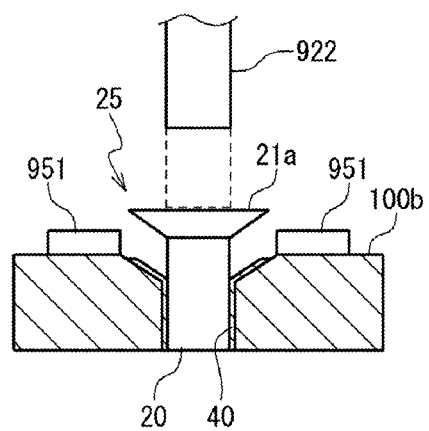
FIG. 17 is a conceptual diagram for explaining the step of driving the fastener.

With reference to FIG. 17, at the step of driving the fastener 25, the holding portion 951 of the chuck 95 is separated from the fastener 25, and the snap 922 repeatedly hits the head top surface 21a.

The controller 80 moves the head base 91 and the snap driver 921 toward the work 100 at a predetermined moving speed, by the moving device 7. While the head base 91 and the snap driver 921 move toward the work 100 at the predetermined moving speed, the snap 922 repeatedly hits and drives the fastener 25. The predetermined moving speed is smaller than a speed of the snap 922 hitting and driving the fastener 25. The predetermined moving speed is set in advance. Consequently, bottoming is prevented when fastener 25 is driven.

Figure 18:
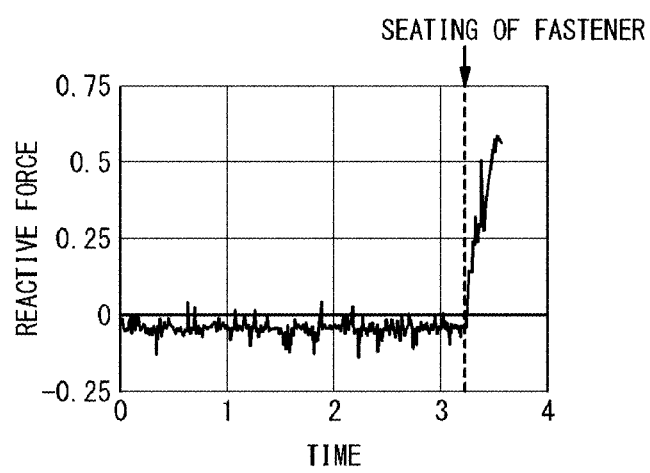
FIG. 18 is a graph indicating a change in a reactive force that acts on an impact force applying device before and after the fastener is seated.

FIG. 18 is a graph indicating a change in the reactive force that acts on the impact force applying device 92 before and after the seating of the fastener 25. When the fastener 25 is seated, namely, when the head portion 21 contacts with the countersunk hole wall surface 100d through the countersunk portion 41, the reactive force sharply increases. The controller 80 stops the impact force applying device 92 applying the impact force to the fastener 25, on the basis of the reactive force detected by the load cell 8, and stops the moving device 7. Since the addition of the impact force to the fastener 25 is stopped based on the detection result of the reactive force acting on the impact force applying device 92, the driving of the fastener 25 is automatically stopped.

As mentioned above, the fastener driving device and the method of driving fastener according to the present invention have been described with reference the embodiments, however, the present invention is not limited to the above-mentioned embodiments. For example, the guide 932 and the spring 933 may not be provided. In this case, the moving body 931 is fixed to the head base 91. The automatic alignment unit 94 may not be provided. In this case, the chuck 95 is fixed to the moving body 931. The function for pushing the fastener 25 and the function for driving the fastener 25 may be provided in different heads. The insertion force adjusting unit 93, the automatic alignment unit 94 and the chuck 95 may not be provided in the rivet inserting-driving head 9. In this case, the fastener driving device according to the present invention is used only for driving the fastener 25.

As mentioned above, though the present invention has been described with reference to the embodiments, the present invention is not limited to the above-mentioned embodiments. Various modifications may be performed on the above-mentioned embodiments. The above-mentioned embodiments may be combined with each other.

This application is based upon Japanese patent application No. 2011-100770 filed on Apr. 28, 2011, and the disclosure of which is incorporated herein in by reference.

The invention claimed is:

1. A fastener driving device, comprising:
an impact force applying device configured to repeatedly apply impact forces to one fastener;
a load cell configured to detect a reactive force acting on the impact force applying device; and
a controller,
wherein the impact force applying device comprises:
a snap driver; and
a snap configured to be driven by the snap driver to reciprocate on a first straight line,
wherein the controller controls the snap driver such that the snap repeatedly hits the one fastener by reciprocating the snap on the first straight line, and
wherein the impact force applying device is configured to stop applying the impact force based on a detection result of the reactive force during the application of the impact forces to the one fastener.

2. The fastener driving device according to claim 1, further comprising:
a head base;
a moving device configured to move the head base along the first straight line;
a moving body supported by the head base so as to be movable along the first straight line;
a spring configured to bias the moving body along the first straight line; and
a chuck configured to hold the one fastener,
wherein the chuck is supported by the moving body.

3. The fastener driving device according to claim 2,
wherein the moving body is disposed below the head base,
wherein the spring is disposed above the moving body, and
wherein the chuck is supported by the moving body such that the chuck is disposed below the moving body.

4. The fastener driving device according to claim 2, wherein
the chuck is configured to hold the fastener so that the fastener is arranged on the first straight line.

5. The fastener driving device according to claim 2,
wherein the chuck is attached to the moving body through an automatic alignment unit,
wherein the automatic alignment unit includes a plurality of elastic bodies arranged in parallel between the moving body and the chuck, and
wherein the plurality of elastic bodies connect the moving body and the chuck, so that the chuck is movable in a plane perpendicular to the first straight line and the chuck is able to swing around a swinging axis which is perpendicular to the first straight line.

6. The fastener driving device according to claim 2, further comprising:
a first detector configured to detect a first displacement of the head base along the first straight line; and
a second detector configured to detect a second displacement of the moving body relative to the head base along the first straight line,
wherein the chuck is configured to release the fastener on the basis of the first displacement and the second displacement.

7. A fastener driving device, comprising:
an impact force applying device configured to repeatedly apply impact forces to a fastener;
a load cell configured to detect a reactive force acting on the impact force applying device;
a head base;
a moving device configured to move the head base along a first straight line;
a moving body supported by the head base so as to be movable along the first straight line;
a spring configured to bias the moving body along the first straight line; and
a chuck configured to hold the fastener;
a shelf board on which the fastener stands, with a head portion of the fastener faster being at a lower side; and
a fastener feeding device configured to feed the fastener to the chuck from the shelf board,
wherein the impact force applying device is configured to stop applying the impact force based on a detection result of the reactive force,
wherein the chuck is supported by the moving body,
wherein a notch is provided in the shelf board,
wherein the fastener feeding device comprises a holding portion configured to hold the fastener in an axial direction of the fastener,
wherein the holding portion comprises a first part and a second part respectively contacting with one and another ends of the fastener in the axial direction, and
wherein the holding portion is configured to be rotatable so that the first part and the second part turn upside down.

8. The fastener driving device according to claim 7,
wherein the shelf board has a circular shape,
wherein the notch is provided so as to extend toward a center from an edge of the shelf board, and
wherein the shelf board is configured to rotate around a rotation axis passing through the center.

9. A method of driving a fastener, the method comprising:
repeatedly applying impact forces to one fastener, by an impact force applying device;

detecting a reactive force acting on the impact force applying device during the repeatedly applying of the impact forces to the one fastener; and stopping the impact force applying device applying the impact force to the fastener, based on a detection result of the reactive force, wherein the repeatedly applying of the impact forces to the one fastener includes repeatedly hitting the one fastener with a snap by reciprocating the snap on a first line.

10. The method of driving a fastener according to claim 9, wherein the impact force applying device comprises:

the snap; and a snap driver configured to drive the snap, wherein the repeatedly applying of the impact forces comprises:

moving, by a moving device, the snap driver toward a work in which the one fastener is driven at a predetermined speed; and repeatedly hitting the one fastener by the snap while the snap driver moves toward the work at the predetermined speed, wherein the predetermined speed is smaller than a speed at which the fastener is hit by the snap to be driven.

11. The method of driving a fastener according to claim 9, further comprising:

pushing the one fastener into a hole provided in the work, by an inserting head; and releasing the one fastener, wherein the inserting head comprises:

a head base;

a moving body supported by the head base so as to be movable along the first line, which is a straight line;

a spring configured to bias the moving body along the first straight line; and a chuck configured to hold the one fastener, wherein the chuck is supported by the moving body, wherein the pushing of the one fastener into the hole provided in the work comprises:

moving the head base along the first straight line; and adjusting a force for pushing the one fastener into the hole, by the spring, wherein in the releasing of the one fastener, the chuck releases the one fastener.

12. The method of driving a fastener according to claim 11, wherein the impact force applying device comprises:

a snap driver attached to the head base; and the snap configured to be driven by the snap driver, wherein in the pushing of the one fastener into the hole provided in the work, the chuck holds the one fastener so that the one fastener is arranged on the first straight line, and wherein in the repeatedly applying of the impact forces to the one fastener, the snap driver drives the snap so as to reciprocate on the first straight line.

13. The method of driving a fastener according to claim 11, wherein the chuck is attached to the moving body through an automatic alignment unit, wherein the automatic alignment unit comprises a plurality of elastic bodies arranged in parallel between the moving body and the chuck, and wherein in the pushing of the one fastener into the hole provided in the work further comprises adjusting a misalignment between the one fastener and the hole, by the plurality of elastic bodies.

14. The method of driving a fastener according to claim 11, further comprising:

holding the one fastener in an axial direction of the one fastener by a holding portion of a fastener feeding device, wherein the one fastener stands on a shelf board, in which a notch is provided, with a head portion of the one fastener being at a lower side;

rotating the holding portion so that the head portion is at an upper side;

moving the fastener feeding device;

holding an axial portion of the one fastener by the chuck; and releasing the one fastener by the holding portion.

15. The method of driving a fastener according to claim 14, wherein the shelf board has a circular shape, wherein the notch is provided so as to extend from an edge of the shelf board to a center, and wherein the method further comprises rotating the shelf board around a rotation axis passing through the center.

16. The method of driving a fastener according to claim 11, further comprising:

detecting a first displacement of the head base along the first straight line;

detecting a second displacement of the moving body relative to the head base along the first straight line; and releasing, by the chuck, the one fastener on the basis of the first displacement and the second displacement.

* * * * *